(12) United States Patent
Namiki

(10) Patent No.: US 12,236,663 B2
(45) Date of Patent: Feb. 25, 2025

(54) IMAGE PROCESSING SYSTEM

(71) Applicant: FANUC CORPORATION, Yamanashi (JP)

(72) Inventor: Yuta Namiki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 350 days.

(21) Appl. No.: 17/758,678

(22) PCT Filed: Jan. 12, 2021

(86) PCT No.: PCT/JP2021/000646
§ 371 (c)(1),
(2) Date: Jul. 12, 2022

(87) PCT Pub. No.: WO2021/145304
PCT Pub. Date: Jul. 22, 2021

(65) Prior Publication Data
US 2023/0033339 A1 Feb. 2, 2023

(30) Foreign Application Priority Data

Jan. 17, 2020 (JP) ................................. 2020-005768

(51) Int. Cl.
*G06V 10/75* (2022.01)
*B25J 9/16* (2006.01)
(Continued)

(52) U.S. Cl.
CPC .......... *G06V 10/751* (2022.01); *B25J 9/1697* (2013.01); *G01B 11/25* (2013.01); *G06T 7/73* (2017.01)

(58) Field of Classification Search
CPC ................... G06V 10/751; G06T 7/73; G06T 2207/30108; G06T 7/75;
(Continued)

(56) References Cited

U.S. PATENT DOCUMENTS 9,746,855 B2 * 8/2017 Kobayashi ............. B25J 9/1697
2013/0230235 A1 * 9/2013 Tateno .................. G06T 19/003
382/154
(Continued)

FOREIGN PATENT DOCUMENTS

JP H05-241626 A 9/1993
JP 2009-002761 A 1/2009
(Continued)

OTHER PUBLICATIONS

International Search Report issued in PCT/JP2021/000646; mailed Mar. 30, 2021.

*Primary Examiner* — Edward F Urban
*Assistant Examiner* — Michael Kim Maiden
(74) *Attorney, Agent, or Firm* — Studebaker & Brackett PC

(57) ABSTRACT

The present invention addresses the problem of providing an image processing system that can accurately and efficiently detect a target object even when the positional relationship between an image capturing device and the target object differs between the time of teaching and the time of detection. An image processing system 1 includes: a control unit 52 that obtains, on the basis of position information of a robot 2 for specifying the position of a visual sensor 4 in a robot coordinate system and on the basis of position information showing the position of a target object W in an image coordinate system, the positional relationship between the visual sensor 4 and the target object W; and a storage unit 51 that stores, on the basis of a model pattern consisting of feature points extracted from a teaching image and on the basis of the positional relationship between the visual sensor 4 and the target object W when capturing the teaching image, the model pattern in the form of three-dimensional position information. The control unit 52 performs detection processing, in which the target object W is detected from a (Continued)

detection image on the basis of a result obtained by matching the model pattern with the feature points extracted from the detection image including the target object W.

4 Claims, 9 Drawing Sheets

(51) Int. Cl.
*G01B 11/25* (2006.01)
*G06T 7/73* (2017.01)

(58) Field of Classification Search
CPC .. G06T 2207/30194; G06T 2207/30164; B25J 9/1697; B25J 9/1692; G05B 2219/39057; G05B 2219/37097; G05D 3/00; G01B 11/25

See application file for complete search history.

(56) References Cited

U.S. PATENT DOCUMENTS

| | | | | |
|---|---|---|---|---|
| 2016/0005161 A1* | 1/2016 | Aiso | ................... | G06V 10/772 |
| | | | | 382/153 |
| 2017/0256046 A1* | 9/2017 | Watanabe | ............... | G06F 18/22 |

FOREIGN PATENT DOCUMENTS

| | | | |
|---|---|---|---|
| JP | 2012-042396 A | 3/2012 |
| JP | 2013-130508 A | 7/2013 |
| JP | 2017-091079 A | 5/2017 |
| JP | 2017-182274 A | 10/2017 |

\* cited by examiner

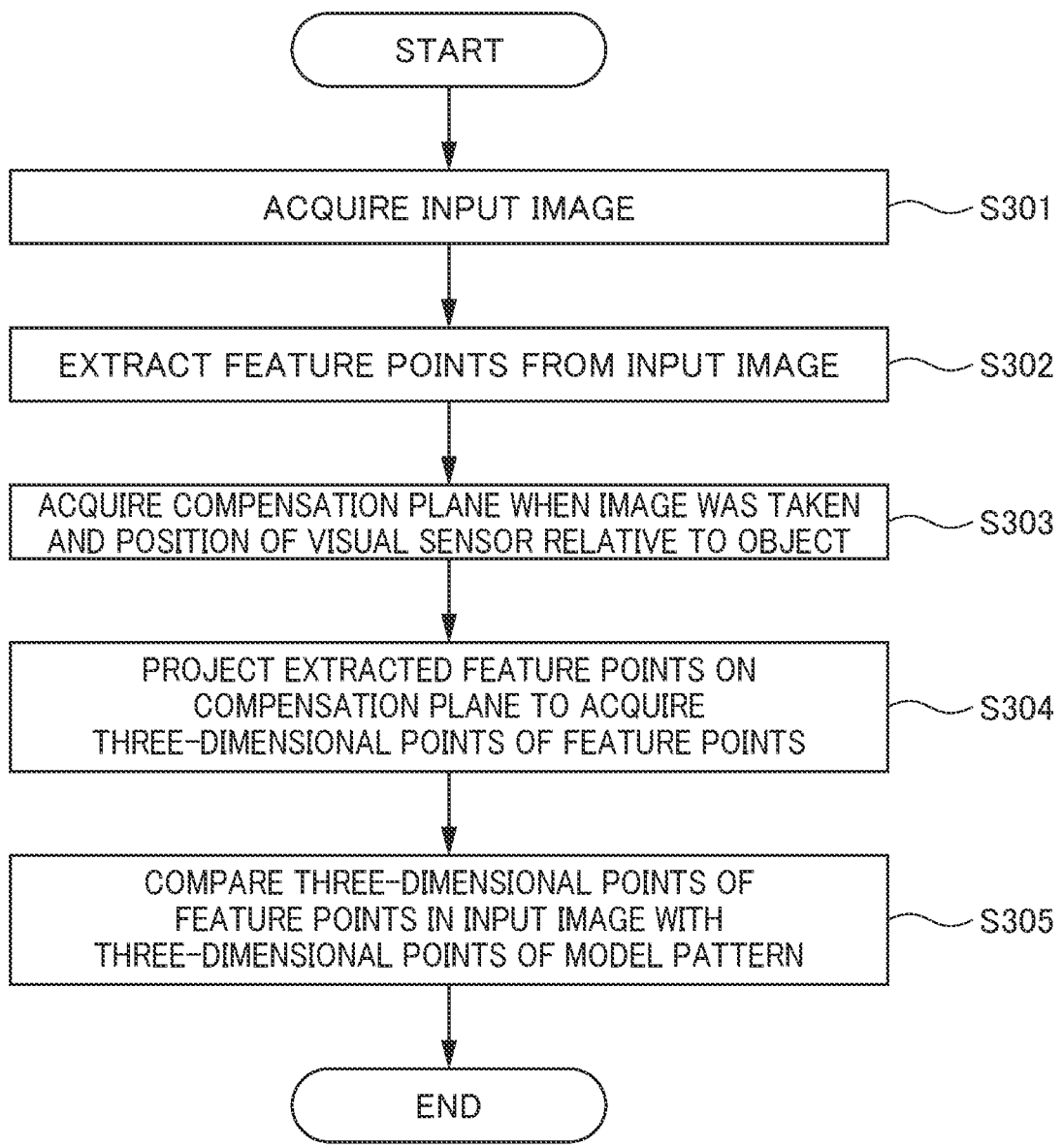

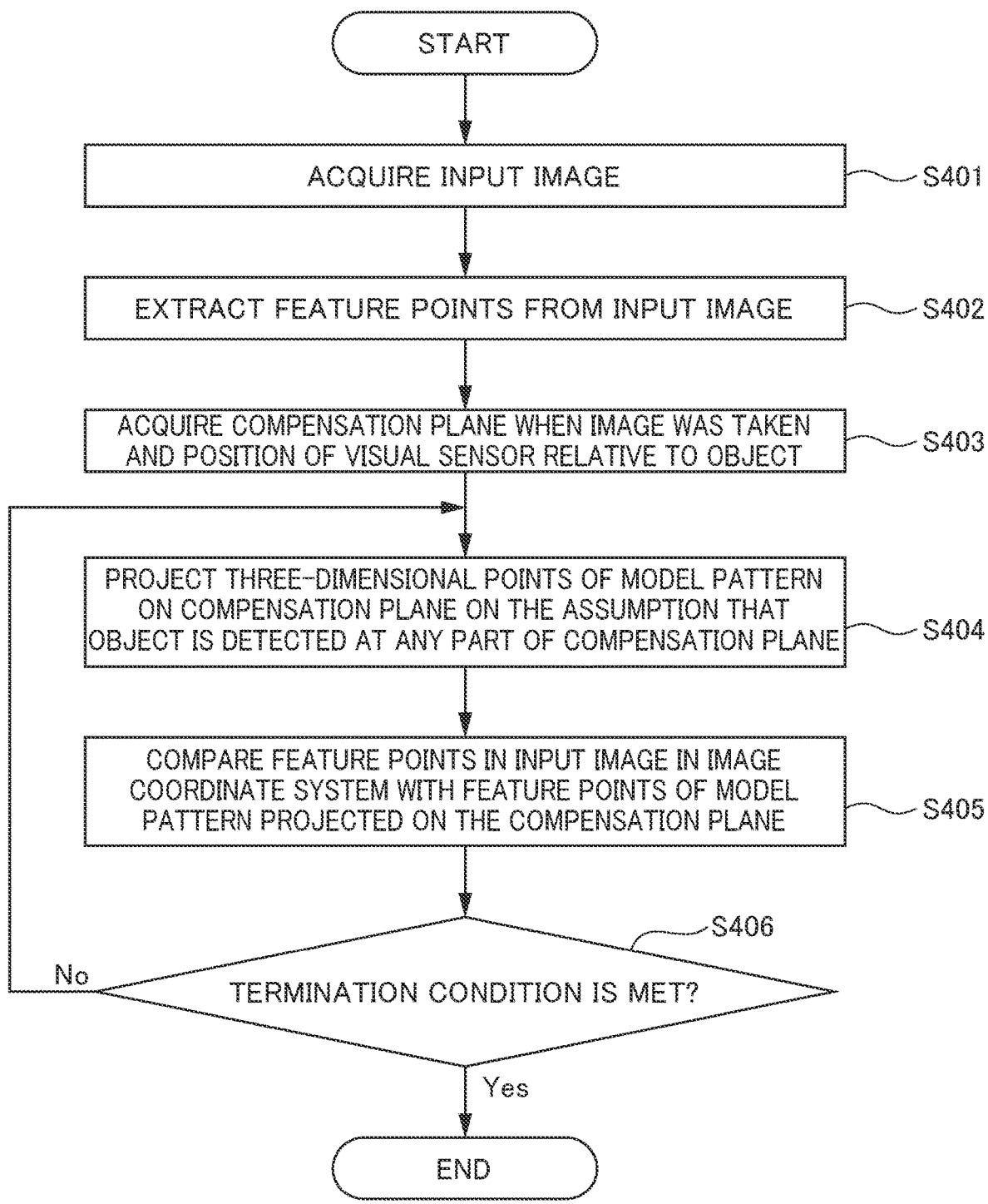

IMAGE PROCESSING SYSTEM

TECHNICAL FIELD

The present invention relates to an image processing system.

BACKGROUND ART

Conventionally, there is a known technique of comparing feature values of a two-dimensional input image taken by an imaging device with feature values of a model pattern as preset standard information to determine that an object is detected when the degree of matching exceeds a predetermined level. Examples of such a technique include generalized Hankel Fourier transformation. Patent Documents 1 to 3 disclose image processing techniques of detecting an object from an input image.

Patent Document 1 relates to a technique of three-dimensional reconstruction of edges intersecting almost parallel with an epipolar line. For example, Patent Document 1 describes at paragraph 0014 "the first edges e2 and e4 are two of the edges that are located on the same plane and intersect with the epipolar line EP within a predetermined angular range relative to 90 degrees. These edges can be reconstructed three-dimensionally with accuracy by stereo method".

Patent Document 2 relates to a technique of measuring a distance to a predetermined region of a measurement target using at least three imaging devices each taking an image of the measurement target via an imaging lens.

Patent Document 3 relates to a technique of reducing the influence of pseudo image features extracted from an image region corresponding to a shaded region, thereby improving the stability and accuracy of the fitting and the matching.

Patent Document 1: Japanese Unexamined Patent Application, Publication No. 2013-130508

Patent Document 2: Japanese Unexamined Patent Application, Publication No. 2009-002761

Patent Document 3: Japanese Unexamined Patent Application, Publication No. 2012-042396

DISCLOSURE OF THE INVENTION

Problems to be Solved by the Invention

When a two-dimensional camera is used as an imaging device, the result of detection is represented in an image coordinate system. This requires transformation of the two-dimensional detection result represented in the image coordinate system into three-dimensional information represented in a robot coordinate system so that a robot works on the detected object. The transformation into the three-dimensional information is carried out by, for example, a method of projecting the detection result found in the image on an imaginary plane on the assumption that the detection result is present on a particular plane.

When a positional relationship between the imaging device and the object when a model pattern is taught is different from a detected positional relationship between the imaging device and the object, the size and shape of the object in the image differ from those of the taught model pattern. Detection of the object in this state may fail or take time. This phenomenon tends to occur when the robot moves the imaging device or the object and their positional relationship changes. Even if the imaging device is fixed, similar problems would happen when the imaging device is relocated and relative positions of the object and the imaging device change. Existing techniques have similar problems.

Means for Solving the Problems

An image processing system of the present disclosure is an image processing system that detects an image of an object from an image taken by an imaging device whose position relative to the object is changed by a robot. The image processing system includes: a controller that acquires a positional relationship between the imaging device and the object based on positional information of the robot used to identify the position of the imaging device in a robot coordinate system and positional information indicating the position of the object in an image coordinate system; and a storage that stores a model pattern, which is formed of feature points extracted from an image for teaching, in the form of three-dimensional positional information based on the model pattern and a positional relationship between the imaging device and the object when the image for teaching was taken. The controller executes a detection process of detecting the object from a detected image including the object based on the result of matching between feature points extracted from the detected image and the model pattern.

Effects of the Invention

The present disclosure provides an image processing system capable of detecting an object correctly and efficiently even when a detected positional relationship between an imaging device and the object is different from a taught positional relationship between the imaging device and the object.

BRIEF DESCRIPTION OF THE DRAWINGS

FIG. 9 is a flowchart of a matching process of a first example; and

FIG. 10 is a flowchart of a matching process of a second example.

PREFERRED MODE FOR CARRYING OUT THE INVENTION

Figure 1:
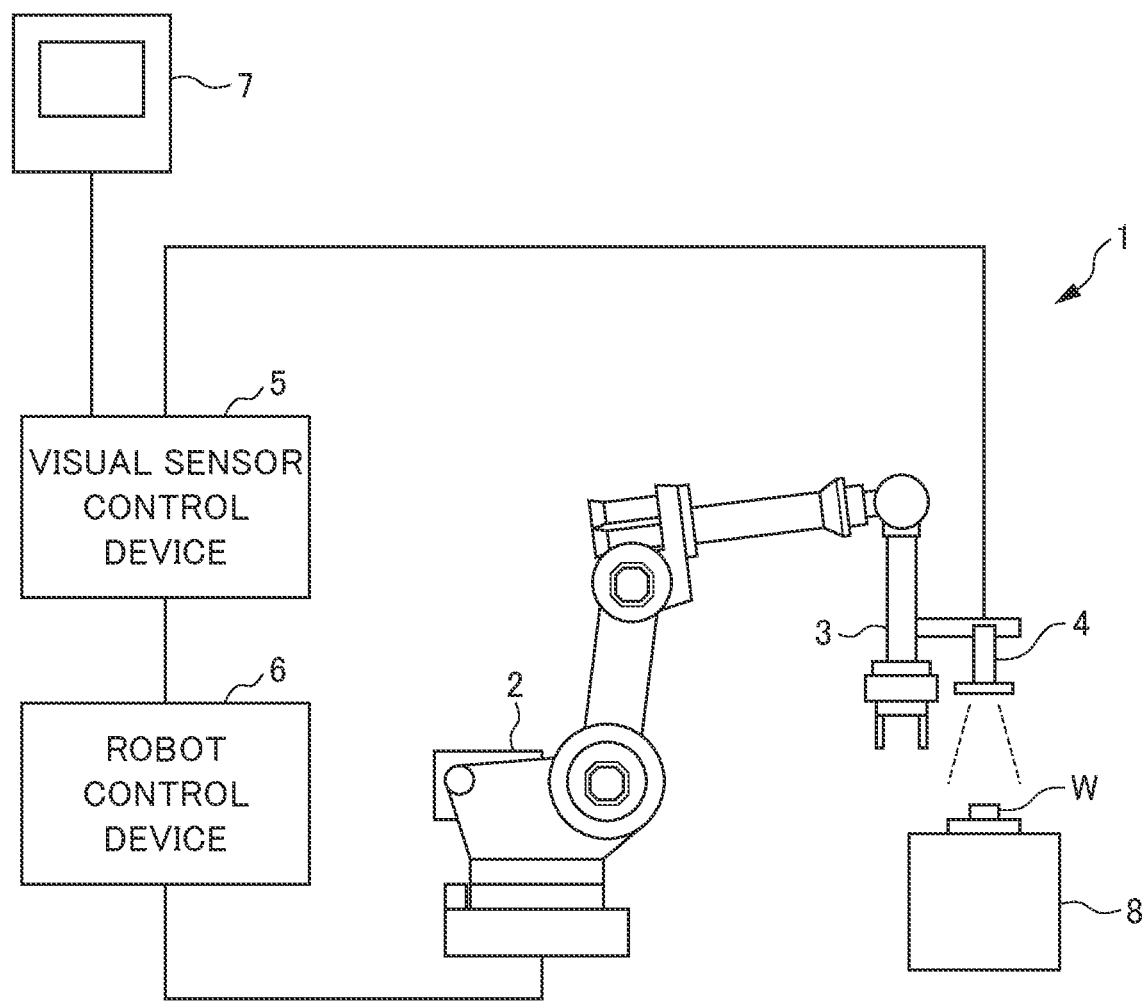
FIG. 1 is a view illustrating a configuration of an image processing system.

An embodiment of the present invention will be described below. FIG. 1 is a diagram illustrating a configuration of an image processing system 1 according to the embodiment of the present invention. The image processing system 1 shown in FIG. 1 detects an image of an object W from an image taken by a visual sensor 4 serving as an imaging device whose position relative to the object W is changed by a robot 2. In the following description, an "image coordinate system" refers to a coordinate system (in two dimensions) defined in an image, and a "sensor coordinate system" refers to a coordinate system (in three dimensions) as viewed from the visual sensor 4. A "robot coordinate system" (mechanical coordinate system) is a coordinate system (in three dimensions) as viewed from the robot 2.

The image processing system 1 of the present embodiment includes the robot 2, an arm 3, the visual sensor 4, a visual sensor control device 5, a robot control device 6, and a console 7. The image processing system 1 recognizes the position of the object W based on, for example, an image of the object W taken by the visual sensor 4, and handles or processes the object W.

A hand or a tool is attached to a tip of the arm 3 of the robot 2. The robot 2 performs work, such as handling and processing of the object W, under control of the robot control device 6. The visual sensor 4 is also attached to the tip of the arm 3 of the robot 2.

The visual sensor 4 is an imaging device that takes an image of the object W under control of the visual sensor control device 5. The visual sensor 4 may be a two-dimensional camera having an image pickup device including a charge coupled device (CCD) image sensor and a lens, or a stereoscopic camera that can perform three-dimensional measurement. In the present embodiment, the visual sensor 4 takes an image of the object W fixed on a worktable 8.

The robot control device 6 executes an operation program of the robot 2 to control the operation of the robot 2. The robot control device 6 operates the robot 2, and the position of the visual sensor 4 relative to the object W changes.

The console 7 is a reception unit via which a user handles the image processing system 1. The user enters various types of commands to the visual sensor control device 5 via the console 7.

Figure 2:
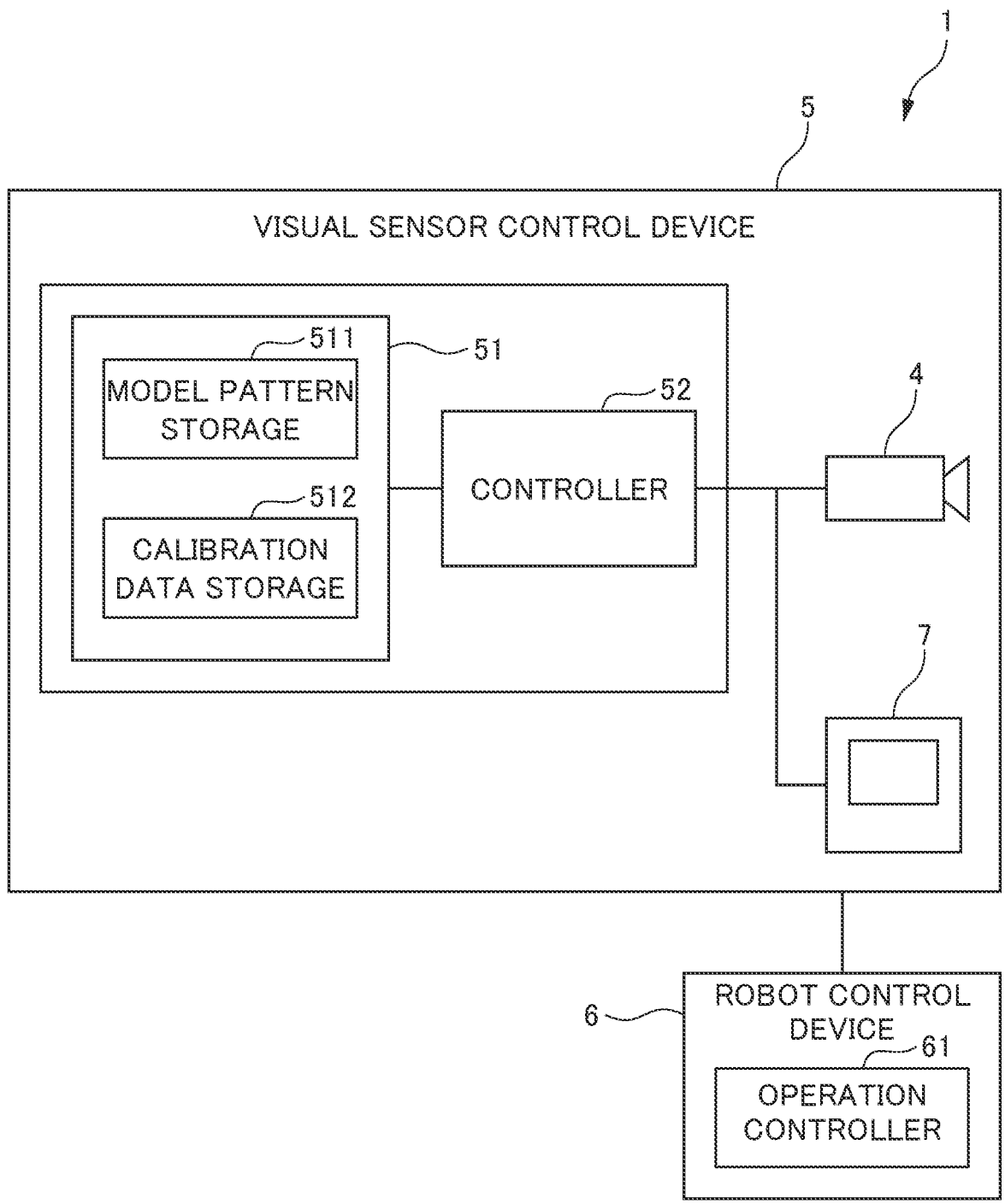
FIG. 2 is a view illustrating configurations of a visual sensor control device and a robot control device.
Figure 3:
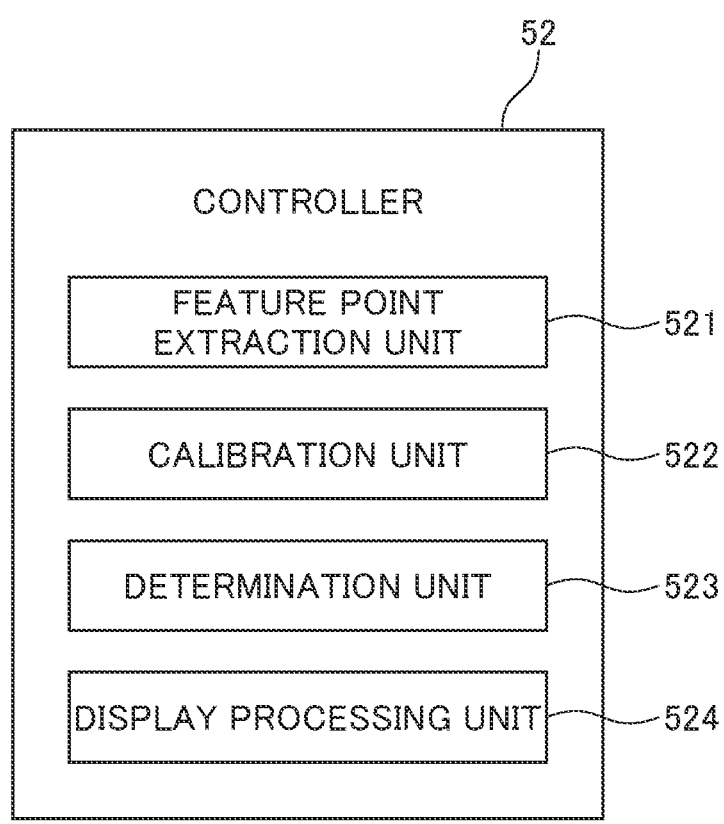
FIG. 3 is a functional block diagram schematically illustrating functions related to image processing executed by a controller.

FIG. 2 is a view illustrating the configurations of the visual sensor control device 5 and the robot control device 6. FIG. 3 is a functional block diagram schematically illustrating the functions related to the image processing executed by a controller. The visual sensor control device 5 of the present embodiment includes a storage 51 and a controller 52.

The storage 51 is a storage device, such as a read only memory (ROM) that stores an operating system (OS) and application programs, a random-access memory (RAM), and a hard disk drive and a solid-state drive (SSD) that store various types of information.

The storage 51 includes a model pattern storage 511 and a calibration data storage 512.

The model pattern storage 511 will be described below. The model pattern storage 511 stores a model pattern which is a modeled image of the object W. Examples of the model pattern will be described later.

The calibration data storage 512 stores calibration data that associates a robot coordinate system which is a standard for control of the operation of the robot 2 with an image coordinate system which is a standard for measurement by the visual sensor 4. The calibration data may have any format, and may be calculated by any proposed method.

The controller 52 is a processor such as a central processing unit (CPU), and functions as an image processing unit that executes various types of control of the image processing system 1.

FIG. 3 is a functional block diagram schematically illustrating the functions related to the image processing executed by the controller 52. As shown in FIG. 3, the controller 52 includes, as functional units, a feature point extraction unit 521, a calibration unit 522, a determination unit 523, and a display processing unit 524. The functional units of the controller 52 work when the program stored in the storage 51 runs.

The feature point extraction unit 521 extracts feature points from an input image taken by the visual sensor 4. Various types of methods can be used to extract the feature points. In the present embodiment, edge points that have a great luminance gradient in the image and can be used to acquire a contour shape of the object are extracted as the feature points. An image of a contour line of the object W generally has a great luminance gradient. Thus, the contour shape of the object W can be acquired by using the edge points as the feature points. A Sobel filter or a Canny edge detector may be used for the extraction of the edge points.

The calibration unit 522 executes transformation between the positions of two-dimensional points in the image coordinate system and the positions of three-dimensional points in the robot coordinate system based on the positional relationship between the visual sensor 4 and the object W and the calibration data stored in the calibration data storage 512. For example, when data of the three-dimensional points in the robot coordinate system is given, the calibration unit 522 calculates the position of an image of the three-dimensional points in the image taken by the visual sensor 4, i.e., the two-dimensional points in the image coordinate system. When data of the two-dimensional points in the image coordinate system is given, the calibration unit 522 calculates a line of sight in the robot coordinate system (world coordinate system). The line of sight is a three-dimensional straight line passing a point of regard and a focus of the visual sensor 4. The point of regard is a three-dimensional point of the object W in the robot coordinate system (three-dimensional positional information of the feature point). The calibration unit 522 executes transformation of the data of the two-dimensional points into the three-dimensional points, i.e., data indicating the three-dimensional position, based on the calculated line of sight.

The determination unit 523 compares a feature point cloud (an edge point cloud) extracted from the input image acquired by the imaging device with the model pattern stored in the model pattern storage 511, and detects the object based on the degree of matching between them.

The display processing unit 524 executes a process of displaying, on the console 7, the result of determination by the determination unit 523 and an operation screen for setting a compensation plane (imaginary plane) which will be described later.

The robot control device 6 includes an operation controller 61. The operation controller 61 runs an operation program of the robot 2 in accordance with a command from the visual sensor control device 5 to control the operation of the robot 2.

Figure 4:
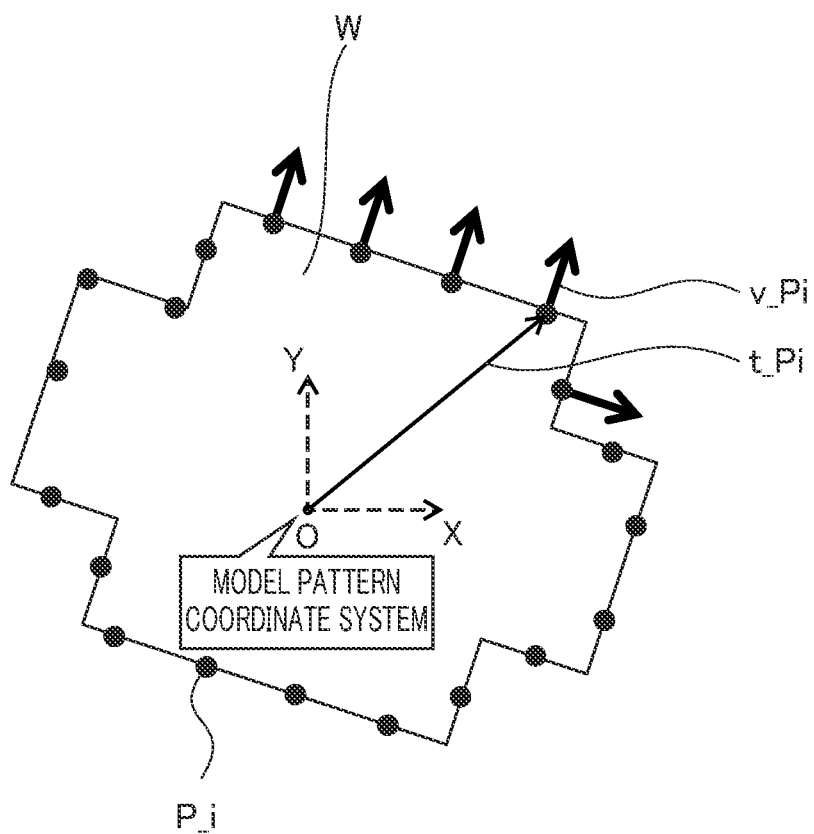
FIG. 4 is a view illustrating a model pattern formed of a plurality of feature points.

How the feature point extraction unit 521 creates the model pattern in the image coordinate system will be described below. FIG. 4 is a view illustrating the model pattern formed of a plurality of feature points. As shown in FIG. 4, the model pattern used in the present embodiment is a model pattern formed of a plurality of feature points P_i. As shown in FIG. 4, the model pattern is formed of the plurality of feature points P_i (i=1 to NP). In this example, the feature points P_i forming the model pattern are stored in the model pattern storage 511.

The position and posture of the feature points P_i forming the model pattern may be represented in any form. For example, a coordinate system of the model pattern is defined (will be hereinafter referred to as a "model pattern coordinate system"), and the position and posture of each of the feature points P_i forming the model pattern are represented by a position vector or a direction vector viewed from the model pattern coordinate system.

The origin O of the model pattern coordinate system may be defined as appropriate. For example, any one point selected from the feature points P_i forming the model pattern may be defined as the origin, or the center of gravity of all the feature points P_i forming the model pattern may be defined as the origin.

The posture (axial direction) of the model pattern coordinate system may be defined as appropriate. For example, the posture may be defined so that the image coordinate system and the model pattern coordinate system are parallel to each other in an image in which the model pattern is created. Alternatively, any two points may be selected from the feature points forming the model pattern so that a direction from one of the two points to the other is defined as an X-axis direction and a direction orthogonal to the X-axis direction is defined as a Y-axis direction. The posture may be defined so that the image coordinate system and the model pattern coordinate system are parallel to each other in an image in which a model pattern 50 is created. Thus, the model pattern coordinate system and the origin O can be suitably changed depending on the circumstances.

Figure 5:
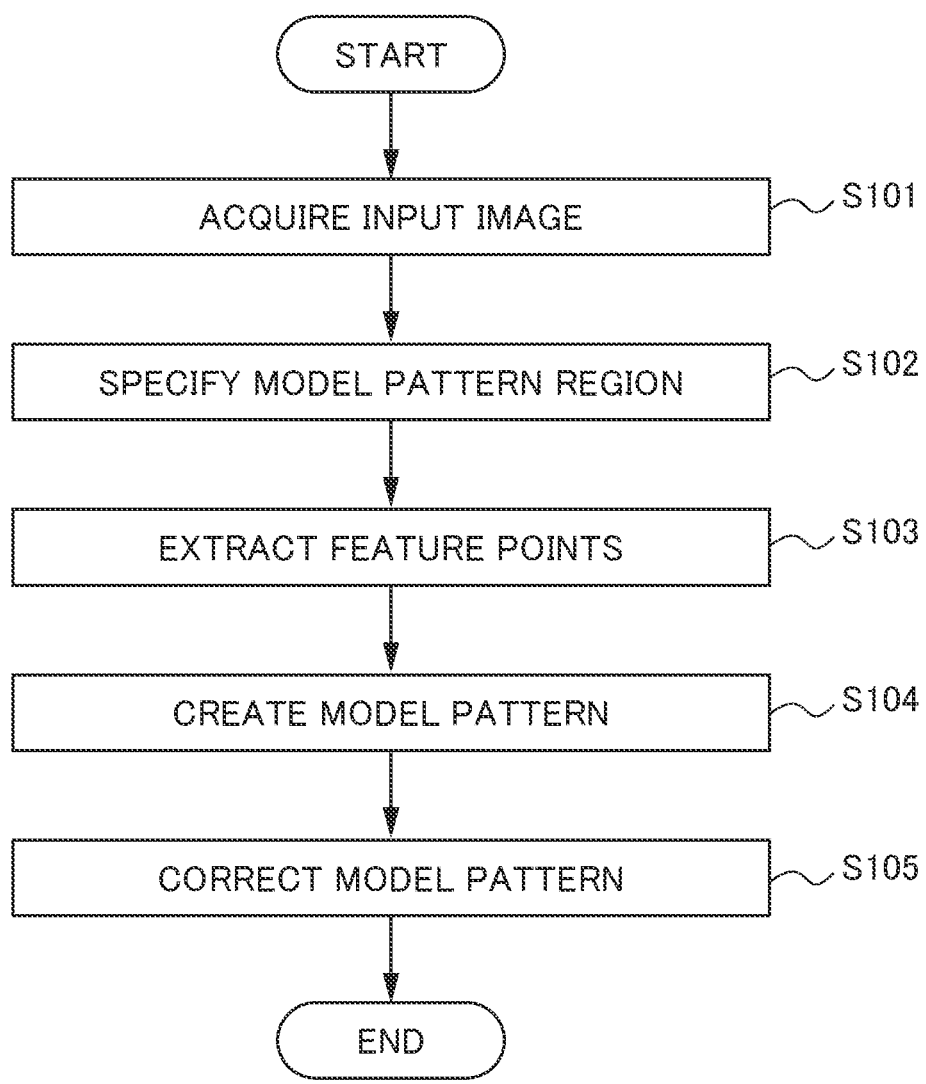
FIG. 5 is a flowchart of a procedure for creating a model pattern.
Figure 6:
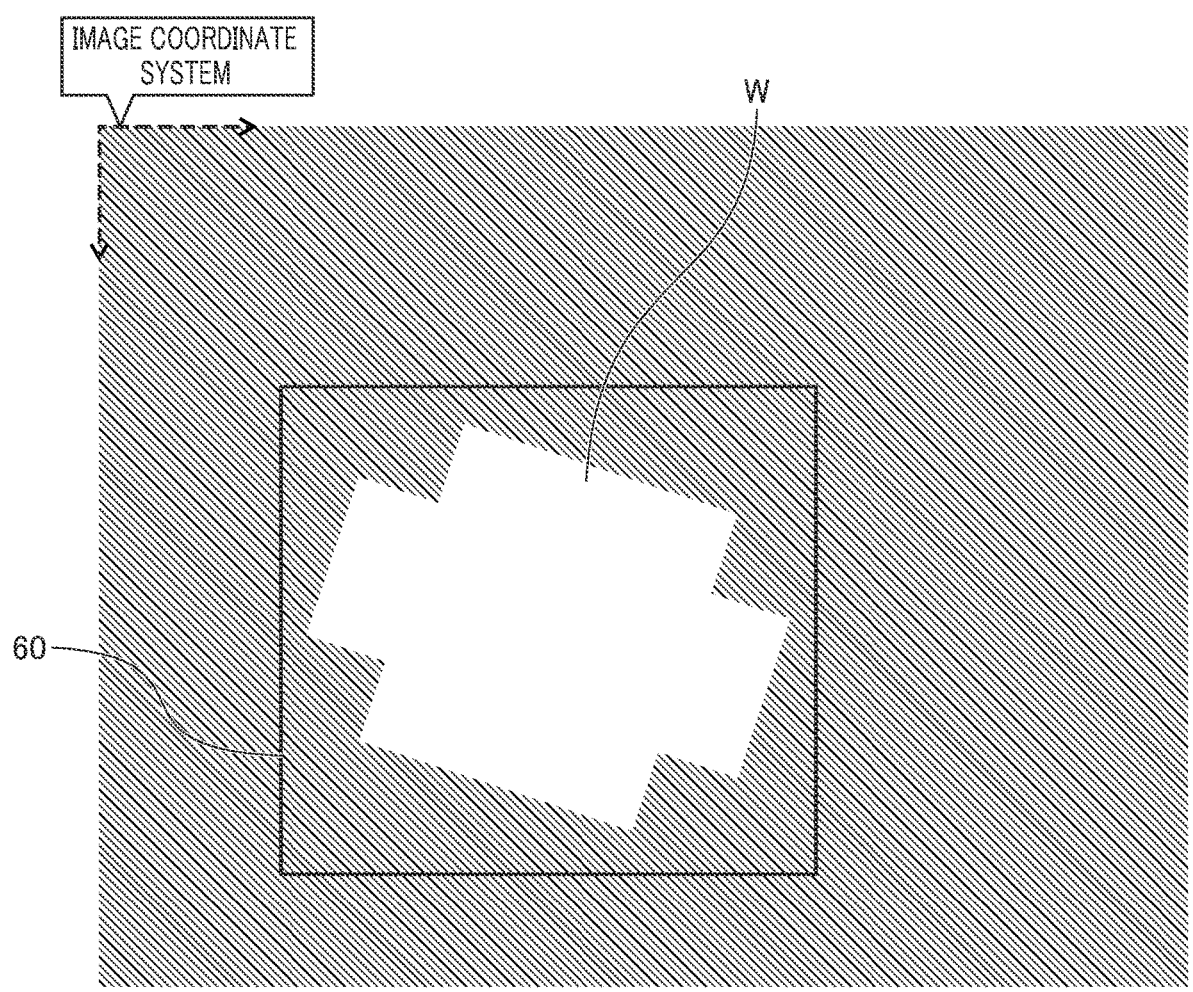
FIG. 6 is a view illustrating a model pattern specification region specified in an image.

An example of how the model pattern is created will be described below. FIG. 5 is a flowchart of a procedure for creating the model pattern. FIG. 6 is a view illustrating a model pattern specification region specified in an image.

First, the object W, which the user wishes to teach as a model pattern, is arranged in a field of view of the visual sensor 4 so that an image of the object W can be taken. Thus, an input image (an image for teaching) including the object W is acquired (Step S101). In this step, the position of the visual sensor 4 relative to the object W is preferably the same as the position of the visual sensor 4 when detecting the object W in actual use.

Then, a region where the object W is found in the taken image is specified as a model pattern region (Step S102). The region specified in Step S102 will be hereinafter referred to as a model pattern specification region 60. The model pattern specification region 60 of the present embodiment is specified by a rectangle or a circle surrounding the object W. The model pattern specification region 60 may be stored as operator-created information in the model pattern storage 511.

Next, the feature points are extracted (Step S103). As described above, the feature points form the model pattern. A plurality of feature points P_i (i=1 to NP) is extracted from the model pattern specification region 60.

In Step S103, physical quantities of the edge points are calculated. Examples of the physical quantities of each edge point include the position of the edge point, and the direction and magnitude of the luminance gradient of the edge point. When the direction of the luminance gradient of the edge point is defined as the posture of the feature point, the posture of the feature point can be defined together with its position. The physical quantities of the edge point, i.e., the position of the edge point, the posture (direction of the luminance gradient) of the edge point, and the magnitude of the luminance gradient of the edge point, are stored as the physical quantities of the feature point.

Then, a model pattern coordinate system is defined in the model pattern specification region 60 and represented by posture vectors v_Pi and position vectors t_Pi of the feature points P_i based on the model pattern coordinate system and the origin O.

Then, the model pattern 50 is created based on the extracted physical quantities of the feature points P_i (Step S104). In Step S104, the extracted physical quantities of the feature points P_i are stored as the feature points P_i forming the model pattern. The feature points P_i constitute the model pattern. In the present embodiment, the model pattern coordinate system is defined in the model pattern specification region 60, and the position and posture of the feature points P_i are stored as values transformed from the values represented in the image coordinate system (see FIG. 6) into the values represented in the model coordinate system (see FIG. 4).

If necessary, the model pattern 50 is corrected (Step S105). The correction of the model pattern in Step S105 is carried out by an operator or the image processing unit 32. Alternatively, the correction may be carried out automatically by machine learning. If the correction of the model pattern is unnecessary, Step S105 may be skipped. The model pattern in the image coordinate system is created by the above-described series of processes.

Figure 7:
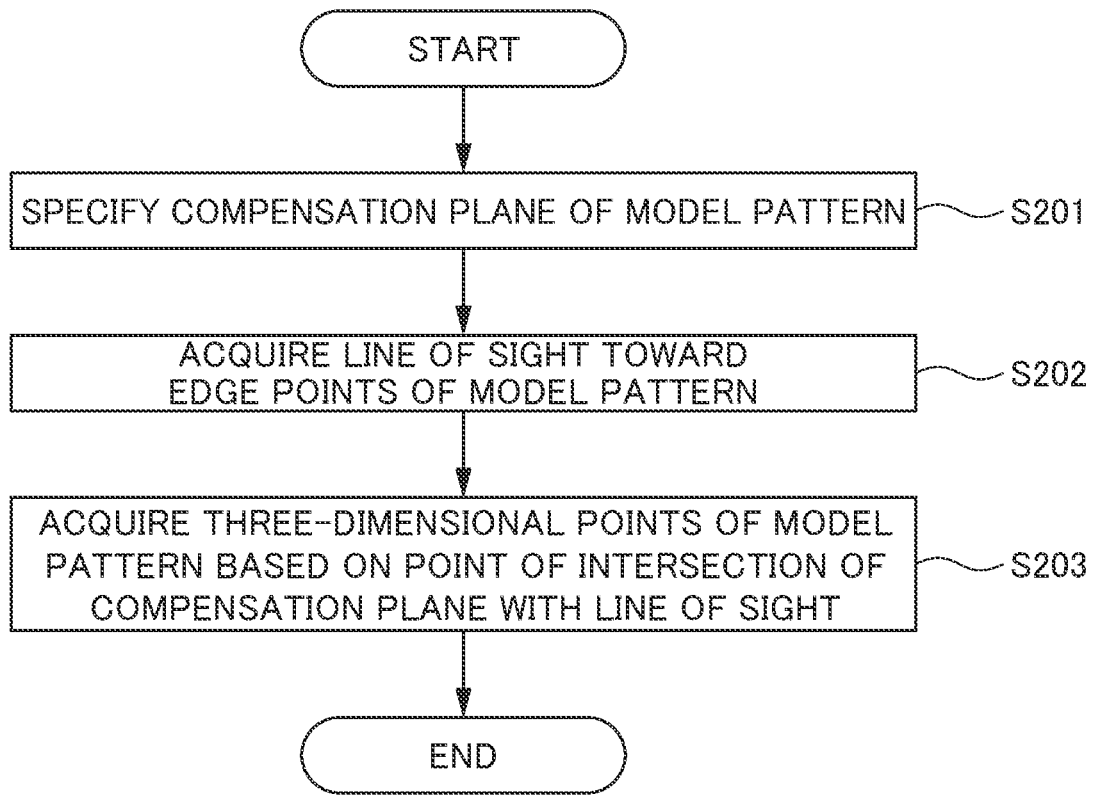
FIG. 7 is a flowchart of transformation of a model pattern into three-dimensional points.
Figure 8:
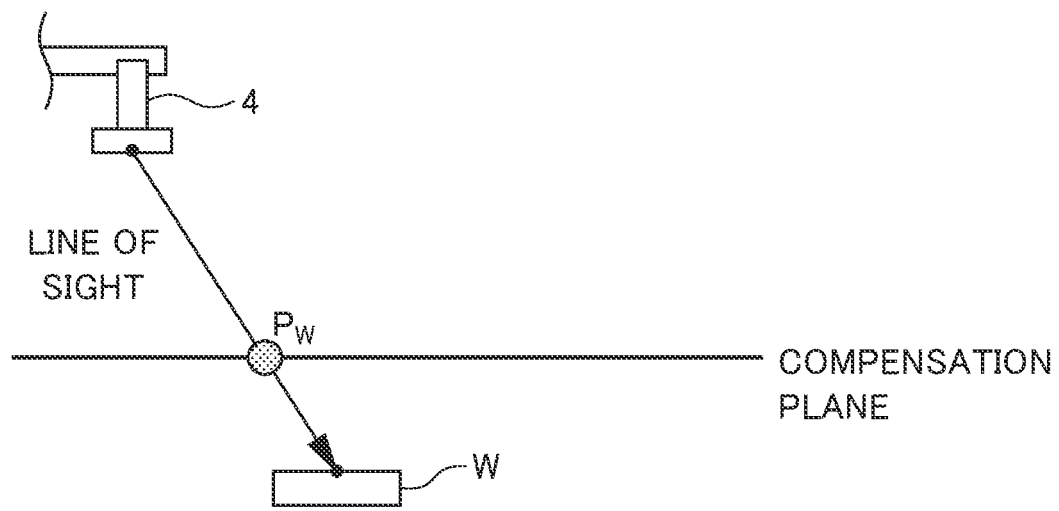
FIG. 8 is a diagram illustrating a relationship between a line of sight of a visual sensor as an imaging device and a compensation plane.

Transformation of the model pattern into three-dimensional points will be described below. The three-dimensional points constitute three-dimensional positional information that identifies the three-dimensional positions of the feature points forming the model pattern. FIG. 7 is a flowchart of the transformation of the model pattern into the three-dimensional points. FIG. 8 is a diagram illustrating a relationship between the line of sight of the visual sensor 4 as the imaging device and a compensation plane.

A plane where the model pattern exists is specified as a compensation plane (Step S201). The compensation plane is an imaginary plane. The compensation plane can be specified by various types of methods. For example, a user sets the compensation plane via the console 7 by adding touch-ups to the compensation plane viewed from the robot coordinate system or the sensor coordinate system with a robot. The compensation plane is not necessarily a single plane, and may include two or more planes or curved surfaces.

The line of sight toward each feature point of the model pattern is acquired based on the calibration data of the visual sensor 4 and the positional information of the robot 2 (Step S202).

As shown in FIG. 8, a point of intersection Pw of the compensation plane acquired in Step S201 with the line of sight acquired in Step S202 is acquired, and the three-dimensional points of the feature points are acquired based on the acquired point of intersection Pw (Step S203). The three-dimensional points constitute the three-dimensional positional information of the feature points. The three-dimensional positional information of the feature points forming the model pattern is stored as information used for the matching in the model pattern storage 511.

As can be seen in the foregoing description, the image processing system 1 of the present embodiment includes: the controller 52 that acquires the positional relationship between the visual sensor 4 and the object W based on the positional information of the robot 2 used to identify the position of the visual sensor 4 in the robot coordinate system and the positional information indicating the position of the object W in the image coordinate system; and the storage 51 that stores the model pattern, which is formed of the feature points extracted from an image for teaching, in the form of three-dimensional positional information based on the model pattern and the positional relationship between the visual sensor 4 and the object W when the image for teaching was taken. The controller 52 executes a detection process of detecting the object W from a detected image including the object W based on the result of matching between the feature points extracted from the detected image and the model pattern. The matching process is performed based on the model pattern stored in the form of the three-dimensional positional information. This can avoid a situation where the taught relative positions of the visual sensor 4 and the object W differ from the detected relative positions of them. This can keep the detection of the object W from failing or taking time, and can detect the object W more correctly and efficiently than known techniques.

The image processing system of the present embodiment acquires the three-dimensional positional information of the model pattern stored in the storage 51 based on the point of intersection of the compensation plane, which is the imaginary plane assumed to include the feature points extracted from the image for teaching, with the line of sight of the visual sensor 4 toward the feature points of the object W. This allows the acquisition of the three-dimensional positional information of the model pattern using the compensation plane which is the imaginary plane, and thus, allows more correct detection using the compensation plane. In the present embodiment, the object W is assumed to be detected on a certain plane (compensation plane). This assumption allows the acquisition of the three-dimensional positional information of each of the feature points (edge points) forming the model pattern.

The image processing system 1 of the present embodiment detects the image of the object W from the input image including the object to be detected based on the three-dimensional positional information of each of the feature points forming the model pattern. The detection of the object W using the three-dimensional positional information of each feature point forming the model pattern can be carried out by a number of methods.

First, a matching process of a first example will be described with reference to FIG. 9. FIG. 9 is a flowchart of the matching process of the first example.

In Step S301, the controller 52 acquires an input image taken by the visual sensor 4. The input image is a detected image of a matching target including the object W to be detected. The image of the matching target is different from the image for teaching used to create the model pattern, and is newly acquired by the visual sensor 4.

In Step S302, the controller 52 extracts the edge points as the feature points from the input image. The edge points can be extracted by the method described above.

In Step S303, the controller 52 acquires the compensation plane when the image was taken and the position of the visual sensor 4. The compensation plane is an imaginary plane similar to the imaginary plane set in the creation of the model pattern. The position of the visual sensor 4 mentioned herein is the position of the visual sensor 4 relative to the object W. The position of the visual sensor 4 is acquired based on the calibration data, the positional information of the robot 2, the compensation plane, and the positional information of the object W in the image coordinate system. For example, when the visual sensor 4 is a two-dimensional camera, the point of intersection of the line of sight toward the edge points with the compensation plane is acquired on the assumption that the feature points (edge points) are present on the compensation plane. When the visual sensor 4 is a three-dimensional sensor, information of a distance to the position of the edge points is acquired to acquire the three-dimensional positional information.

In Step S304, the edge points, which are the feature points extracted from the input image of the matching target (detected image), are projected on the compensation plane to acquire three-dimensional points as the three-dimensional positional information of the edge points. Thus, data of a three-dimensional point cloud extracted from the input image of the matching target is acquired.

In Step S305, a matching process is performed, i.e., the three-dimensional points extracted from the input image of the matching target (detected image) are compared with the three-dimensional points forming the model pattern. In this process, an image of the object is detected from the input image of the matching target.

In the detection process of the first example, the feature points in the detected image are acquired in the form of the three-dimensional positional information based on the point of intersection of the compensation plane, which is the imaginary plane assumed to include the feature points extracted from the detected image, with the line of sight of the visual sensor 4 toward the feature points of the object W. Then, the object W is detected from the detected image based on the result of the matching process of comparing the feature points in the detected image acquired in the form of the three-dimensional positional information with the feature points based on the model pattern stored in the form of the three-dimensional positional information. In the first example, the detection process can correctly reflect the three-dimensional positional information of the model pattern, allowing the detection of the object W from the detected image based on the suitable positional relationship. When three-dimensional rotation is added to the model pattern in the matching process, the detection can be achieved irrespective of a three-dimensional change in posture. Thus, the first example can address the three-dimensional change in posture.

Next, a matching process of a second example will be described with reference to FIG. 10. FIG. 10 is a flowchart of the matching process of the second example.

In Step S401, the controller 52 acquires an input image taken by the visual sensor 4. The input image is an image of a matching target including the object W to be detected. The image of the matching target is different from the input image used to create the model pattern, and is newly acquired by the visual sensor 4.

In Step S402, the feature points are extracted from the input image. The controller 52 extracts the edge points as the feature points from the input image. The edge points can be extracted by the method described above.

In Step S403, the controller 52 acquires the compensation plane when the image was taken and the position of the visual sensor 4.

In Step S404, the controller 52 executes a process of projecting the three-dimensional points of the model pattern on the compensation plane on the assumption that the object W is detected at any part of the compensation plane.

In Step S405, the controller 52 performs matching between the feature points in the input image in the image coordinate system and the feature points of the projected model pattern. Specifically, the two-dimensional points of the feature points in the input image are compared with the feature points obtained by two-dimensionally transforming the three-dimensional points of the model pattern to acquire the degree of matching. The degree of matching can be calculated by any known method, such as the above-described Hankel Fourier transformation.

In Step S406, whether a termination condition is met is determined, and the processes of Steps S404 and 405 are repeated until the termination condition is met. When the process returns from Step S406 to Step S404, the three-dimensional points of the model pattern are projected on the compensation plane on the assumption that the object W is detected at any part different from the part assumed last time, and then the process of Step S405 is performed. Thus, the image of the object W is detected based on the matching result having the high degree of matching among the matching results. Various types of conditions can be set as the termination condition, e.g., the detection result showed the high degree of matching, or a predetermined time has passed.

Thus, the detection process of the second example includes repeating the projection process of projecting the model pattern on the imaginary plane to acquire the feature points in the image coordinate system on the assumption that the feature points extracted from the detected image are detected at a certain part of the imaginary plane and the matching process of comparing the feature points in the image coordinate system extracted from the detected image with the feature points in the image coordinate system based on the model pattern acquired in the projection process, thereby detecting the object from the detected image based on the result of the matching process having a high degree of matching. In the second example, the detection process can correctly reflect the three-dimensional positional information of the model pattern, allowing the detection of the object W from the detected image based on the suitable positional relationship. In this example, the difference in how the object looks depending on the viewing position can be addressed by repeating the projection process and the matching process. Thus, the matching process can be carried out in the two-dimensional coordinate system.

Embodiments of the present invention have just been described above, but the present invention is not limited to those exemplary embodiments. The advantages described in the embodiments are merely listed as the most suitable advantages derived from the present invention, and do not limit the advantages of the present invention.

It has been described in the embodiment that the position of the visual sensor 4 as the imaging device relative to the object W is changed by the robot 2, but the present invention is not limited to this configuration. For example, the present invention is applicable to a configuration in which the imaging device is fixed and the object is moved by the operation of the robot. Specifically, a fixed camera may take an image of the object held by the robot. In this case, the object moves when the robot is operated, changing the positional relationship between the imaging device and the object.

In the embodiment, the model pattern formed of a plurality of edge points has been described as an example. However, the model pattern is not limited to this example. For example, pixels may be regarded as the feature points, and the model pattern may be formed in an image format.

EXPLANATION OF REFERENCE NUMERALS

1 Image processing system
2 Robot
4 Visual sensor (imaging device)
51 Storage
52 Controller

The invention claimed is:

1. An image processing system that detects an image of an object from an image taken by an imaging device whose position relative to the object is changed by a robot, the image processing system comprising:
   a controller that acquires a positional relationship between the imaging device and the object based on positional information of the robot used to identify the position of the imaging device in a robot coordinate system and positional information indicating the position of the object in an image coordinate system; and
   a storage that stores a model pattern, which is formed of feature points extracted from an image for teaching, in the form of three-dimensional positional information based on the model pattern and a positional relationship between the imaging device and the object when the image for teaching was taken,
   wherein
   the controller executes
   a detection process of detecting the object from a detected image including the object based on the result of matching between feature points extracted from the detected image and the model pattern,
   wherein the detection process includes repeating
   a projection process of projecting the model pattern on an imaginary plane to acquire the feature points in the image coordinate system on the assumption that the feature points extracted from the detected image are detected at a certain part of a predetermined imaginary plane and
   a matching process of comparing the feature points in the image coordinate system extracted from the detected image with the feature points in the image coordinate system based on the model pattern acquired in the projection process, thereby detecting the object from the detected image based on the result of the matching process having a high degree of matching.

2. The image processing system of claim 1, wherein the three-dimensional positional information of the model pattern stored in the storage is acquired based on a point of intersection of
   an imaginary plane on which the feature points extracted from the image for teaching are assumed to be present with
   a line of sight of the imaging device toward the feature points of the object.

3. An image processing system that detects an image of an object from an image taken by an imaging device whose position relative to the object is changed by a robot, the image processing system comprising:
   a controller that acquires a positional relationship between the imaging device and the object based on positional information of the robot used to identify the position of the imaging device in a robot coordinate system and positional information indicating the position of the object in an image coordinate system; and
   a storage that stores a model pattern, which is formed of feature points extracted from an image for teaching, in the form of three-dimensional positional information based on the model pattern and a positional relationship between the imaging device and the object when the image for teaching was taken,
   wherein
   the controller executes
   a detection process of detecting the object from a detected image including the object based on the result of matching between feature points extracted from the detected image and the model pattern, wherein in the detection process, the feature points in the detected image are acquired in the form of three-dimensional positional information based on a point of intersection of an imaginary plane on which the feature points extracted from the detected image are assumed to be present with a line of sight of the imaging device toward the feature points of the object, and the object is detected from the detected image based on the result of the matching process of comparing the feature points in the detected image acquired in the form of the three-dimensional positional information with the feature points based on the model pattern stored in the form of the three-dimensional positional information.

4. The image processing system of claim 3, wherein the three-dimensional positional information of the model pattern stored in the storage is acquired based on a point of intersection of an imaginary plane on which the feature points extracted from the image for teaching are assumed to be present with a line of sight of the imaging device toward the feature points of the object.

* * * * *